United States Patent Office
3,525,734
Patented Aug. 25, 1970

3,525,734
PROCESS FOR THE PRODUCTION OF CELLULOSE TRIACETATE HAVING GOOD CHARACTERISTICS
André Rajon, Tassin-la-Demi-Lune, France, assignor to Societe Rhodiaceta, Paris, France, a corporation of France
No Drawing. Filed Apr. 3, 1969, Ser. No. 813,344
Claims priority, application France, Apr. 5, 1968, 147,206
Int. Cl. C08b 3/28
U.S. Cl. 260—230      6 Claims

ABSTRACT OF THE DISCLOSURE

Cellulose triacetate containing at most 150 (e.g. 100, 66, 55 or 30) parts per million by weight of combined sulfuric acid and having a dissolution factor of at least 90 (e.g up to 98) in 10 minutes is produced, using as starting material an acetic gum obtained by the acetylation of wood pulp in the presence of sulfuric acid as catalyst, by first stabilizing, e.g., with triethanolamine, then precipitating by progressively adding an aqueous (e.g. 12%) acetic acid solution, e.g. at a temperature of from 10 to 30° C., so that the liquid phase at the end of the precipitation has an acetic acid concentration not exceeding 65%, e.g. 55 to 65%; the resulting precipitate is then washed first with an aqueous acetic acid solution of the same concentration until sulfate ions have practically disappeared from the washing water, then with aqueous acetic acid having a concentration such that it is miscible in all proportions with an aliphatic ether (e.g. ethyl or isopropyl ether) and thereafter, without intermediate drying, directly displacing the aqueous acetic acid solution with the aliphatic ether until a neutral reaction is obtained, the resulting ether impregnated cellulose triacetate being dried, e.g. air dried.

BACKGROUND OF THE INVENTION

In copending application Ser. No. 730,601 there is described a cellulose triacetate containing at most 150 parts per million by weight of combined sulfuric acid and having a dissolution factor of at least 90 in 10 minutes, said dissolution factor being determined as hereinafter set forth, and a method of producing it by a process which comprises precipitating with water cellulose triacetate from an acetic gum produced with sulfuric acid as catalyst, displacing with an aliphatic ether the aqueous liquid impregnating the precipitated cellulose triacetate and drying the resulting product, a further organic liquid being optionally used as an intermediate liquid before the water is displaced with the aliphatic ether.

It is an object of the present invention to provide cellulose triacetate comparable in quality to that of the said copending application by a simplified procedure which is more easily carried out on an industrial scale than the process of said previous application.

Other objects and advantages of the present invention will become apparent from the detailed description given hereinafter.

It should be noted that throughout this specification all percentages are percentages by weight.

SUMMARY OF THE INVENTION

The present invention provides a process for the production of cellulose triacetate containing less than 150 parts per million by weight of combined sulfuric acid and having a dissolution factor (determined as described hereinafter) of at least 90 in 10 minutes, in which process, starting with an acetic gum produced with a sulfuric acid catalyst, the cellulose triacetate is precipitated with water or dilute acetic acid under conditions such that the acetic acid concentration of the liquid phase at the end of the precipitation does not exceed 65%, the precipitate is washed with an aqueous acetic acid solution of the same characteristics until there is no further extraction of sulfuric acid, the washing is terminated with an aqueous acetic acid solution of a concentration such that it is miscible in all proportions with an aliphatic ether, the said solution is displaced with the said ether and the ether impregnated product is dried.

The precipitation of the cellulose triacetate starting with acetic gum in accordance with the invention may be effected either by direct precipitation, that is by the introduction of the acetic gum into the precipitation liquid, or by indirect precipitation, that is by running the precipitation liquid into the acetic gum. The acetic acid concentration of the liquid phase at the end of the precipitation as well as that of the aqueous washing liquors occurring before the last aqueous acetic acid washing may vary considerably but in no case must it exceed 65%. However, it may be advantageous to effect the precipitation under conditions such that the liquid phase at the end of the precipitation has a concentration within the range of from 45 to 65%. Similarly, it is particularly advantageous to use for the intermediate washings of the precipitate an aqueous solution containing 45 to 65% of acetic acid.

In the process of the invention, for the displacement of the last washing liquor with which the precipitated cellulose triacetate is impregnated, there may be mentioned as of particular interest diethyl ether and diisopropyl ether, although other ethers can likewise be used without going outside the scope of the invention.

The process according to the invention enables the obtention of a product having the same solubility characteristics and low combined sulfuric acid content as in the case with the product obtained according to the above mentioned copending application. However, the present process has the advantage over the process of the said copending application of being much simplier and thus much easier to put into effect on an industrial scale.

The last washing before the displacement with the ether according to the present invention must thus be effected with a solution having an acetic acid concentration sufficient to be miscible in all proportions with the aliphatic ether which is to be employed for the final displacement. For example, this concentration must be above 55% if diethyl ether is to be used, whereas it must be at least equal to 75% in the case where the displacement is effected with diisopropyl ether.

The process of the present invention enables the elimination of the intermediate displacement of the precipitation liquid by an organic liquid miscible with the ether which is intended to be used for the final displacement; it will be appreciated that in this way all the liquids used for the precipitation, the various washings and the final displacement are solely composed of water, acetic acid and the aliphatic ether employed. There is thus no need for special recovery installations other than those generally used for the extraction and separation of acetic acid from the aliphatic ether.

The dissolution factor referred to herein is determined by the following test:

2.5 g. of dry cellulose triacetate in pulverulent form are introduced into a 100 ml. flask containing 5 glass balls and 75 ml. of a solvent mixture of methylene chloride/methanol in the proportion of 90/10 by weight; the closed flask is placed on a three dimensional stirrer turning at 150 cycles/minute; at regular time intervals 3 ml. of solution are rapidly withdrawn; this material is put into a beaker containing boiling water; the precipitate is recovered by filtration, dried and weighed; if $p$ is the weight in grams of the precipitate corresponding to the $n^{th}$ sample, the percentage by weight of dissolved triacetate is given by the formula:

$$\frac{p[75-3(n-1)]\cdot 100}{3\times 2.5}$$

The number obtained for this percentage represents the dissolution factor.

The following examples in which the parts and percentages are by weight, are given by way of illustration of the invention but in no way limit the scope thereof.

EXAMPLE I

The starting material is an acetic gum obtained in known manner by the acetylation of a wood pulp (acetylation grade) in the presence of sulfuric acid containing:

| | Parts |
|---|---|
| Acetic acid | 82 |
| Cellulose triacetate | 13 |
| Water | 4 |
| Sulfuric acid (free or combined with the triacetate) | 1 |

A small amount of triethanolamine is added in order to stabilize this gum and 1200 parts thereof are placed into a receptacle provided with a stirrer. 980 parts of a 12% acetic acid solution are added progressively while maintaining the temperature at 25° C.

The acetic acid concentration of the liquors at the end of the precipitation amounts to 55%; the liquors are miscible in all proportions with diethyl ether.

The precipitate is recovered on a filter and washed with a 55% aqueous acetic acid solution at 25° C. until sulfate ions have practically disappeared from the washing liquors.

Then, without intermediate drying or use of a further solvent, the precipitate is directly washed with diethyl ether until neutral and dried in air.

This sample, referred to as 1, contains only 90 parts per million of combined sulfuric acid.

By way of comparison, another sample of the same acetic gum but which has been entirely precipitated with water according to the usual methods, contains 30 parts per million of sulfuric acid. This product, referred to as 2, is likewise dried in air.

When applying the dissolution test described above to these two samples the following results are obtained:

| Time of stirring in minutes | 1 | 2 | 5 | 10 | 15 |
|---|---|---|---|---|---|
| Sample 1 | 20 | 43.5 | 68 | 95 | 100 |
| Sample 2 | 14.9 | 35.9 | 48.8 | 71 | 75 |

The above example describes one application of the process without, however, limiting it in any way. It is evident especially that, depending on the temperature and depending on the aliphatic ether used, the limit of the compatibility range of that ether with the mixtures of acetic acid and water may vary to a certain extent.

EXAMPLE II

The starting material is the same quantity of the same acetic gum as in Example I; it is treated in the same manner with triethanolamine and cellulose triacetate is precipitated in the same way as in Example I, but in this case the precipitation is effected at a temperature of 30° C. The precipitate is recovered on a filter and washed at 10° C. with a 65% aqueous acetic acid solution until sulfate ions have practically wholly disappeared from the washing liquors.

Without intermediate drying or use of a further solvent, the precipitate is directly washed with diethyl ether until neutral and dried in air. This sample contains only 60 parts per million of combined sulfuric acid and has the following dissolution factor as a function of the stirring times.

Stirring time in minutes:
1 _____ 26.2
2 _____ 64
5 _____ 78.5
10 _____ 93.5

EXAMPLE III

The starting material is the same quantity of the same acetic acid gum as in Example I; it is treated in the same way with triethanolamine and cellulose triacetate is precipitated in the same way, but in this case the precipitation temperature is 10° C. The precipitate is recovered on a filter and washed at 10° C. with a 55% aqueous acetic acid solution until sulfate ions have practically wholly disappeared from the washing liquors.

Without intermediate drying or use of a further solvent the precipitate is directly washed with diethyl ether until neutral and then dried in air. This sample contains only 55 parts per million of combined sulfuric acid and has the following dissolution factor as a function of the stirring times.

Stirring time in minutes:
1 _____ 33.4
2 _____ 55
5 _____ 75
10 _____ 90

EXAMPLE IV

The starting material is the same amount of the same acetic acid gum as in Example I; it is treated in the same way with triethanolamine and precipitated in the same way, but in this case 600 parts of 12% aqueous acetic acid are used for the precipitation and the temperature is maintained at 25° C. The concentration of the liquors at the end of the precipitation amounts to 65% of acetic acid. The precipitate is recovered on a filter, washed at 10° C. with a 65% aqueous acetic acid solution until practically all sulfate ions have disappeared from the washing liquor. The precipitate is then again washed at 10° C. with a 75% aqueous acetic acid solution.

Thereafter, without intermediate drying or use of a further solvent, the precipitate is directly washed with diisopropyl ether until neutral and dried in air.

This sample contains only 100 parts per million of combined sulfuric acid and has the following dissolution factor as a function of the stirring times.

Stirring time in minutes:
1 _____ 63.5
2 _____ 93
5 _____ 97
10 _____ 98
15 _____ 100

Although the present invention is described herein with particular reference to specific details, it is not intended that such details shall be regarded as limitations upon the scope of the invention except insofar as included in the accompanying claims.

I claim:
1. A process for the production of cellulose triacetate containing less than 150 parts per million by weight of combined sulfuric acid and having a dissolution factor of at least 90 in 10 minutes, in which process, starting with an acetic gum produced with sulfuric acid as catalyst, cellulose triacetate is precipitated by means of a liquid selected from the class consisting of water and dilute aqueous acetic acid solution, under conditions such that the liquid phase at the end of the precipitation has an acetic acid concentration not greater than 65% by weight, the precipitate is washed with an aqueous acetic acid solution having an acetic acid concentration not greater than 65% by weight until sulfuric acid is no longer extracted, the washing of the precipitate is concluded with an aque- ous acetic acid solution of a concentration such that it is miscible in all proportions with an aliphatic ether to be used for the displacement of the aqueous acetic acid impregnation liquid, the impregnation liquid is displaced with the said aliphatic ether and the resulting ether impregnated product is dried, said dissolution factor being determined by the following test:

2.5 g. of dry cellulose triacetate in pulverulent form are introduced into a 100 ml. flask containing 5 glass balls and 75 ml. of a solvent mixture of methylene chloride/methanol in the proportion of 90/10 by weight; the closed flask is placed on a three-dimensional stirrer turning at 150 cycles/minute; at regular time intervals 3 ml. of solution are rapidly withdrawn; this material is put into a beaker containing boiling water; the precipitate is recovered by filtration, dried and weighed; if $p$ is the weight in grams of the precipitate corresponding to the $n$th sample, the percentage by weight of dissolved triacetate is given by the formula:

$$\frac{p[75-3(n-1)]\cdot 100}{3\times 2.5}$$

2. A process according to claim 1, in which the said aliphatic ether is selected from diethyl ether and diisopropyl ether.

3. A process according to claim 1, in which the said aqueous acetic acid concentration in the liquid phase at the end of the precipitation is within the range of from 45 to 65% by weight.

4. A process according to claim 1, in which the said aliphatic ether is selected from diethyl ether and diisopropyl ether, and the said aqueous acetic acid concentration in the liquid phase at the end of the precipitation is within the range of from 45 to 65% by weight.

5. A process according to claim 1, in which there is used for intermediate washings of the cellulose triacetate precipitate before the displacement with the aliphatic ether an aqueous acetic acid solution containing 45 to 65% by weight of acetic acid.

6. A process according to claim 1, in which the said aliphatic ether is selected from diethyl ether and diisopropyl ether, the said aqueous acetic acid concentration in the liquid phase at the end of the precipitation is within the range of from 45 to 65% by weight and there is used for intermediate washings of the cellulose triacetate precipitate before the displacement with the aliphatic ether an aqueous acetic acid solution containing 45 to 65% by weight of acetic acid.

References Cited
UNITED STATES PATENTS

| | | | |
|---|---|---|---|
| 2,036,397 | 4/1936 | Clarke et al. | 260—230 |
| 2,230,387 | 2/1941 | Schneider | 260—230 |
| 2,264,828 | 12/1941 | Crum | 260—230 |
| 2,418,211 | 4/1947 | Williams | 106—196 |
| 2,805,171 | 9/1957 | Williams | 106—196 |
| 2,843,583 | 7/1958 | Voris | 260—223 |
| 3,109,743 | 11/1963 | Fleck et al. | 106—183 |

DONALD E. CZAJA, Primary Examiner

R. W. GRIFFIN, Assistant Examiner

U.S. Cl. X.R.

106—175, 190, 196; 260—227